United States Patent [19]

Pearlstein

[11] 4,428,593
[45] Jan. 31, 1984

[54] GASKET ASSEMBLY HAVING IMPROVED SEALING CHARACTERISTICS AND METHOD OF MAKING SAME

[75] Inventor: Robert S. Pearlstein, Mount Prospect, Ill.

[73] Assignee: Felt Products Mfg. Co., Skokie, Ill.

[21] Appl. No.: 302,692

[22] Filed: Sep. 15, 1981

Related U.S. Application Data

[63] Continuation-in-part of Ser. No. 282,262, Jul. 10, 1981.

[51] Int. Cl.³ .................. F16J 15/06; F16J 15/10
[52] U.S. Cl. ........................... 277/235 B; 277/1; 277/235 A
[58] Field of Search ............... 277/1, 22, 166, 168, 277/180, 235 A, 235 B; 156/277, 280, 306

[56] References Cited

U.S. PATENT DOCUMENTS

| | | | |
|---|---|---|---|
| 1,847,729 | 3/1932 | Shaw | 277/166 |
| 2,681,241 | 6/1954 | Aukers | 277/211 |
| 2,828,988 | 4/1958 | Gorsica et al. | 277/235 B |
| 3,352,564 | 11/1967 | Johnson | 277/235 B |
| 3,794,333 | 2/1974 | Czernik et al. | 277/235 B X |
| 3,837,657 | 9/1974 | Farnam et al. | 277/1 |
| 4,213,620 | 7/1980 | Kennedy et al. | 277/235 B |
| 4,290,616 | 9/1981 | Nicholson | 277/1 |
| 4,331,336 | 5/1982 | Czernik et al. | 277/1 |

Primary Examiner—Stuart S. Levy
Assistant Examiner—Lloyd D. Doigan
Attorney, Agent, or Firm—Dressler, Goldsmith, Shore, Sutker & Milnamow, Ltd.

[57] ABSTRACT

A head gasket assembly particularly for an internal combustion engine. The gasket assembly has at least one combustion opening and a plurality of other apertures, and comprises at least a pair of expansive gasketing layers secured to each other. A sealing pattern of elastomer or metal or the like is provided between the layers so that they envelope the sealing pattern. The sealing pattern desirably surrounds at least one of the opening and the apertures for enhancing the sealing effect of the gasket assembly in the zone of the sealing pattern, thereby to protect the sealing pattern from direct contact with the engine head and block. The sealing pattern is adhered to one of the layers, and the layers are adhered to each other by adhesive under pressure in a zone closely surrounding the sealing pattern to restrict lateral movement of the sealing pattern and to compress and densify at least one of the layers in the zones overlying the sealing pattern to enhance the sealing characteristics of the gasket assembly.

15 Claims, 6 Drawing Figures

GASKET ASSEMBLY HAVING IMPROVED SEALING CHARACTERISTICS AND METHOD OF MAKING SAME

RELATED APPLICATIONS

This application is a continuation-in-part of U.S. application Ser. No. 282,262 filed on July 10, 1981.

TECHNICAL FIELD

Laminated gaskets having a sealing pattern applied to their surfaces, as by silk screening, have become increasingly important in the sealing of gaskets, such as those for internal combustion engines. It is with improvements in such gaskets that this invention is concerned.

BACKGROUND OF THE INVENTION

For a number of reasons, the facing sheets of laminated gasket assemblies frequently require the application of coatings or surfacings in addition to supplemental sealing patterns to enhance sealing in localized areas, thereby to enable the gasket to resist fretting corrosion, abrasion and disturbance or destruction of the sealing pattern. Because the sealing patterns are often difficult to adhere to pre-treated facing sheets, i.e. surface treatments which may be beneficial for the facing but which may impede curing or adherance, it is frequently necessary to apply the sealing patterns, and thereafter apply a coating or surfacing to the gasket facing sheet, sometimes without coating the sealing pattern. That is considerably more difficult and more expensive and sometimes less effective, than if the coating, surfacing or treatment were applied first and the sealing pattern was thereafter applied.

SUMMARY OF THE INVENTION

In accordance with the present invention, those and other impediments to the inexpensive and more effective manufacture of improved gaskets bearing sealing patterns and having improved sealing characteristics are eliminated. Other substantial advantages are achieved as well.

A gasket assembly of this invention may comprise a head gasket assembly for an internal combustion engine. The gasket assembly is adapted to be disposed between the head and the block of the engine. The gasket assembly defines at least one combustion opening and a plurality of apertures, as for oil and water. The gasket assembly comprises a pair of gasketing layers laminated to each other, at least one of the layers being of a compressible, substantially coextensive facing material.

A sealing pattern is disposed intermediate a pair of gasketing layers, and preferably surrounds at least one of the openings and the apertures for enhancing the sealing effect of the gasket assembly in the zone of the sealing pattern. Accordingly, when the head gasket is placed in compression between a head and a block, the sealing pattern is protected from direct contact with the head and block and enhances the sealing characteristics of the gasket assembly.

The sealing pattern may be incompressible and deformable, as of elastomeric material, or the pattern may be non-deformable at the loads encountered, such as of metal.

Preferably the sealing pattern is adhered to one of gasketing layers and the gasketing layers are adhered to each other in the zone closely surrounding the sealing pattern, thereby to prevent substantial movement of the sealing pattern laterally when the gasket assembly is placed in compression. Preferably, in use, the gasket assembly is compressed in the zone of the sealing pattern such that at least one gasketing layer is compressed above the sealing pattern to a height no greater than about one-half of the height of the sealing pattern.

The invention further comprises a method of making a gasket assembly for disposition between a pair of surfaces to be sealed comprising the steps of disposing a sealing pattern on the surface of a gasketing layer, positioning a facing layer over the gasketing layer and the sealing pattern so that the sealing pattern is enveloped between the gasketing layer and the facing layer, the gasket assembly defining at least one opening about which the sealing pattern is disposed, and adhering the facing layer to the gasketing layer under pressure so that at least one of the facing layer and gasketing layer is compressed and densified in the zone of the sealing pattern, whereby in use the sealing pattern of the gasket assembly is protected from direct contact with the surfaces to be sealed and enhances the sealing characteristics of the gasket assembly.

Other advantages and features of the present invention will become apparent from the following detailed description of the invention and preferred embodiments thereof, from the claims and from the accompanying drawings.

DETAILED DESCRIPTION OF THE ILLUSTRATIVE EMBODIMENT

Figure 2:
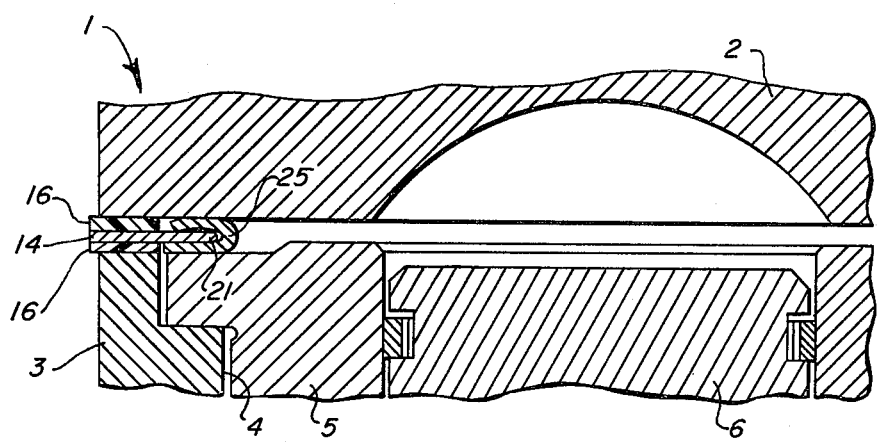
FIG. 2 is a fragmentary, cross-sectional view an engine employing the gasket assembly shown in FIG. 1.

Referring now to the drawings, an engine 1 having a head 2 and a block 3 is illustrated as employing a gasket assembly 10 which is especially configured and constructed to be used therein. Block 3 is seen to include a combustion cylinder 4, a cylinder sleeve 5 and piston 6. Engine 1 has a plurality of combustion cylinders 4 only one of which is shown in FIG. 2. Although it is clear that gasket assemblies made in accordance with this invention can be employed with an engine having only one combustion cylinder, the invention will be illustrated by a multi-combustion opening gasket assembly and engine.

Gasket assembly 10 is a laminate, and is seen to comprise three gasketing layers laminated to each other, including a generally flat, solid, expansive metal core 14 and a pair of generally flat expansive facing layers 16. Core 14 comprises upper and lower flat or planar faces, such as surfaces 18, to which facing layers 16 are laminated. The core may also be coined, embossed, or may be otherwise surface modified, as by etching, in desired locations.

Facing layers 16 are formed of a composite, compressible gasket facing material and may be fiber reinforced. They are laminated mechanically or adhesively to the core surfaces 18, as by a suitable heat-activated adhesive. Suitable heat activatable adhesives include phenolic-nitrile rubber and polybutyral rubber which is desirable initially applied to the facing sheet surfaces. The facing layers may incorporate asbestos, glass fibers, or other suitable fibrous materials, and may utilize nitrile, neoprene or polyacrylic elastomers as a binder. Frequently the binder comprises from about 15 to about 25% of the facing layer, whether asbestos fibers, or whether other organic or inorganic fibers, fillers or the like are used. In the embodiment illustrated, the facing layers 16 have a thickness of about 0.025 inch, although, of course, this may vary with the application. Facing layers 16 generally resist degradation by oils and coolants, retain torque, minimize extrusion, and exhibit heat resistance.

The gasket assembly 10 is die-cut or blanked out, such as with a stamping machine, punch press or other suitable form of equipment to provide combustion openings 20, and apertures, such as bolt holes 22, and a plurality of fluid flow passageways, such as oil and water passageways 24. The core may be of cold, rolled steel and its thickness may vary with the application. Thicknesses of from about 0.006 inch to about 0.050 inch are typical. To enhance adherence, the core surfaces 18 may be phosphatized, i.e., coated with a phosphate coating, in a conventional manner, or may be otherwise surface treated to improve adhesion. Gasket assembly 10 may then be provided with suitable annular armoring 25 secured in a known manner to help seal the combustion opening.

In this embodiment, the desired sealing pattern 26 is disposed on and secured to one or both surfaces of the core. The sealing pattern 26 may comprise a series of sealing beads, such as beads 30, applied to those zones in which increased or augmented sealing forces are required in the application for which the gasket assembly 10 is to be used. Typically beads 30 are formed substantially to surround water and oil passages between the associated head and block. Beads may also be applied substantially to surround the combustion openings. At times, because of the configuration of the head and block, and the location of the bolt holes, or for other design reasons, less than a circular or completely encircling bead configuration is required.

In the embodiment illustrated the sealing pattern 26 forming beads 30 may be formed of a silicone sealant which is preferably deposited by a silk-screening process, typically as described in U.S. Pat. No. 3,477,867, with a height at the high point of the bead of from about 0.006 to about 0.008 inch. The silicone may be a two-component, heat curable liquid silicone. When the sealing beads are deposited and adhered to the dimensionally stable, highly adherant core, they may be precisely, accurately and consistently located from gasket to gasket.

After the sealing pattern is deposited and cured in a known manner on the surfaces 18 of core 14, compressible facing layers 16 are positioned to overlie the core, and the sealing pattern is laminated to the core as by an conventional intervening adhesive layer. The adhesive adheres the facing layer to the core and when the core and layers are laminated under pressure, the facing layer is pre-compressed and densified in the zone of the sealing pattern. When the core is phosphatized, or otherwise suitably treated to enhance bonding, the facing layers 16 will adhere readily and securely to the core surfaces and, depending upon the sealant comprising the sealant pattern 26, may or may not adhere to the beads 30. In any event, the facing layers and metal core envelope and surround the sealing beads.

Desireably the facing layer 16 is secured to core surface 18 in a zone Z which closely surrounds the beads, thereby to confine the bead and to prevent substantial movement of the sealing pattern and beads laterally when the gasket assembly is placed in compression. The envelopment of the beads has a number of advantages. Among those are that movement or extrusion of the bead, when elastomeric, is restricted, thus enhancing the load bearing capacity of the bead. When the facing layer and core very closely surround the bead, not only is extrusion restricted, but the elastomeric beads tend to display a somewhat stiffer load deflection curve than would the same beads if they were exposed on the surface of the facing sheet, as is conventional. Thus, under compression, bead compression tends to be limited to some embedment in the lower, internal surface of the facing sheet, but without extrusion all so that a bead and the overlying facing can act as a seal under greater compression loads and more effectively than previously possible.

When gaskets employing sealing patterns on their surfaces are used, it is necessary initially to substantially fully embed the sealing pattern in the facing layer before any load is applied in other areas of the gasket. However, with the gasket of the present invention depending upon the precompression in the zones of the enveloped beads, the application of load in zones other than bead zones may take place substantially immediately. When the bead pattern is substantially incompressible, as for example are elastomers such as silicones and other rubbers, and when the gasket is compressed in the bead or sealing pattern zones, either in use or during the manufacturing process, the facing material overlying the sealing pattern becomes densified and, to the extent it was somewhat porous, tends to become even more impervious to the passage of fluids. Thus, the facing material in that zone has enhanced sealing properties and physical characteristics which are different from those in the areas immediately adjoining the bead and sealing pattern zones.

Figure 3:
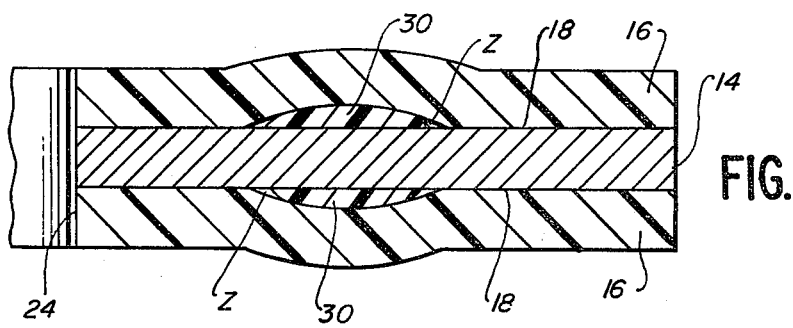
FIG. 3 is an enlarged cross-sectional view taken substantially along line 3—3 of FIG. 1.
Figure 4:
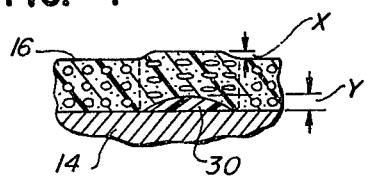
FIG. 4 is a fragmentary view, like FIG. 3, of a portion of FIG. 3 after it is pre-compressed in accordance with this invention.

In FIG. 3, the gasket is illustrated prior to compression in the sealing pattern and bead zones. However, during manufacture the gasket is preferably pre-compressed in those zones, such that the facing layers are densified as illustrated in FIG. 4. There the silicone bead 30 is shown to have been somewhat embedded in the facing layer 16, and the facing layer 16 in the zone of the bead has been compressed. The height Y of the bead which was substantially equal in FIG. 3 to the projection of the facing layer in the zone of the bead, in FIG. 4 has become substantially diminished as shown by height X. Desirably the ratio of heights X to Y is no greater than about 1 to 2, i.e., about one-half, and preferably less. As such the surface of the gasket assembly is more nearly flat than one in which the bead is on the surface, enhancing sealing characteristics of the gasket over its entire surface.

Yet another advantage deriving from the gasket assembly of FIGS. 3 and 4 is that the bead is protected, not only from extrusion, but from surface phenomena.

Such phenomena comprise disruption or disturbance of the beads during shipping, handling and installaton, as well as the tendency to disruption, destruction, distortion or movement of the bead in use in the engine. Such disruption may be due to rough mating surfaces to be sealed wherein the tendency to split or fracture the bead due to the rough finish is high. Furthermore, it is known that excessive heat tends adversely to affect elastomeric sealing beads. By enveloping them, as described, the sealing pattern is insulated from the adverse affects of heat much more than when the pattern is at the surface of the gasket assembly. Additionally, in some environments fretting erosion of the beads occurs. Although facings may be treated to withstand fretting corrosion, it has been very difficult to treat sealing beads, such as silicone beads, with materials which will resist fretting, in part because of the difficulty of adhering a suitable protective layer to the beads.

Also, as has already been mentioned, when the sealing pattern is not on the surface, it becomes possible easily and inexpensively to apply anti-fretting coatings and other surface treatments to an entire facing surface, all without compensating for such treatments, or utilizing additional steps in the manufacture of the gasket assembly. And, by applying the sealing pattern to the core, rather than to the facing sheets, it becomes unnecessary to precoat the facing sheets with special barrier coat materials to facilitate the curing of bead materials, such as silicones, special materials which are now frequently necessary because of the tendency of the facing material itself to inhibit curing. The gaskets of this invention also make it possible to provide improved control of cylinder head distortion.

Although the sealing pattern and beads have been described as being of a silicone elastomer, other elastomers and resilient materials may be used as well, and these include nitrile (polybutadienenitrile rubber) or neoprene rubbers, epoxies, such as flexible and rubber modified epoxies, or combinations of them. Further, because the bead and facing layers cooperate in the transmission of sealing forces in the zones of the bead it is possible to consider the use of somewhat stiffer materials which are not necessarily elastomeric to effect seals in some or all of the locations at which sealing is to be effected via the agency of the beads. The tendency towards embedment of the sealing bead in the facing sheet will also tend to promote sealing conformance of the facing layer surfaces with the head and block in a manner in which they would not were the beads at the outer surfaces as is now conventional.

In the embodiment described the sealing pattern and beads are bonded to the core, and the facings to the core. Depending upon the materials involved, it may also be desirable to bond the beads to the facing as well during the lamination process.

Figure 1:
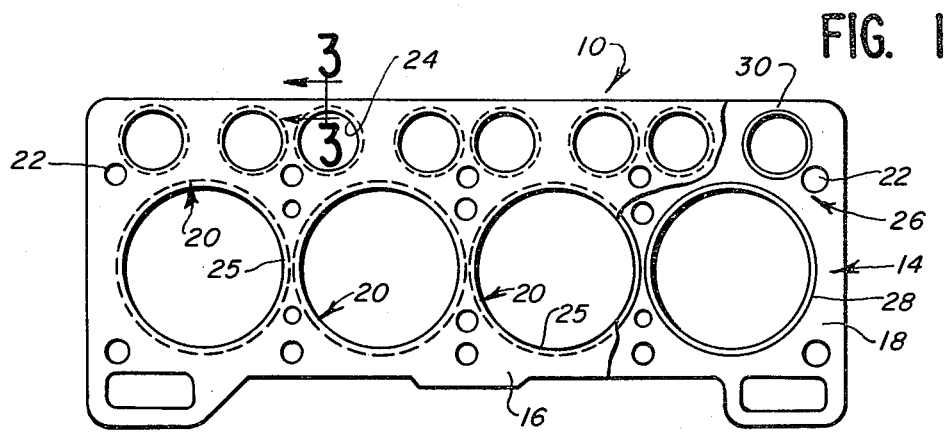
FIG. 1 is a top plan view of one embodiment of a gasket assembly incorporating the principles of the present invention.
Figure 5:
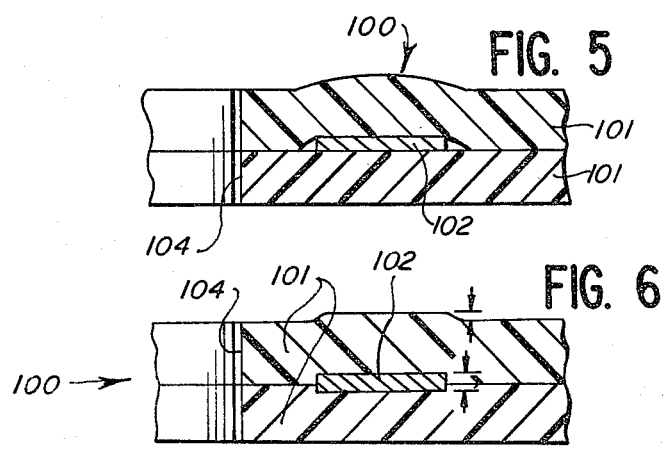
FIG. 5 is a view like FIG. 3 of a further embodiment of this invention.
Figure 6:
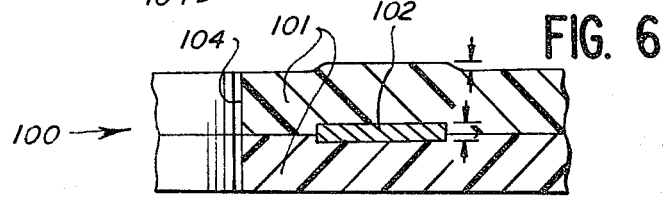
FIG. 6 is a view of the gasket of FIG. 5 showing the gasket assembly of FIG. 5 after it has been pre-compressed.

In a further embodiment of the invention, there is no metallic core. Thus, as seen in FIGS. 5 and 6, gasket assembly 100, shown in fragmentary form only, comprises a pair of gasketing layers 101 which may be compressible sheets formed, as of the same gasketing material as facing layers 16. A sealing pattern 102 is applied in desired locations, as about an opening 104, and the layers 101 are adhered by a suitable heat activatable adhesive. Although the pattern 102 may be elastomeric, as described previously, alternatively the sealing material may be of other material, including metal, ceramics, plastic preforms or other material to enhance the sealing characteristics of the gasket assembly. The pattern 102 may be applied as a preform and may be adhered to one of the gasketing layers for ease of handling prior to lamination of the gasketing layers. The gasketing layers may be bonded closely about the pattern thereby to envelope and limit movement of the pattern laterally. In the embodiment of FIG. 5, pattern 102 is illustrated as a substantially non-deformable metal annulus. As in the case of the embodiment of FIG. 1, the sealing pattern 102 will tend to embed in the facing layers under compression to densify the layers in the zones of the sealing pattern, enhancing the sealing characteristics of the facing layers and promoting more effective distribution of the load across the entire surface to be sealed. Here again, as shown in FIG. 6, the gasketing layers are compressed without distortion of the sealing pattern 102, although at the surface the projection of the facing layer in the zone of the sealing pattern has substantially diminished. Indeed, where both gasketing layers 101 are compressible, the sealing pattern tends to embed in each layer to some extent, as illustrated by FIG. 6.

It is to be noted that with the sealing pattern disposed between the gasketing layers, hard materials, such as metal patterns may be used for assisting in obtaining an effective seal in zones in which they could not have been previously used if on the surface confronting a head, block or the like.

The application of the sealing pattern between the facing layers permits a wide range of materials to be used, without adversely impacting on the surface characteristics of the gasket assembly surface and permits the alteration of the sealing characteristics of the gasket in selected zones without altering the surface of the gasket assembly in any significant respect.

It will be apparent from the foregoing that further embodiments of this invention may be made without departing from the spirit and scope of the invention. Accordingly, the scope of the invention is to be considered as being limited only insofar as may be made necessary by the claims.

What is claimed is:

1. A gasket assembly for disposition between a pair of surfaces to be sealed and to be compressed therebetween comprising:
    a pair of gasketing layers laminated to each other, one of said layers being of a compressible material and the other being metallic,
    a sealing pattern of a substantially incompressible material disposed between said layers and enveloped between said layers,
    at least one opening in said gasket assembly about which said sealing pattern is disposed,
    whereby in use said incompressible sealing pattern is protected from direct contact with said surfaces to be sealed and enhances the sealing characteristics of said gasket assembly.

2. A gasket assembly in accordance with claim 1 in which said gasketing layers are secured to each other in a zone closely surrounding said sealing pattern to prevent substantial movement of said sealing pattern laterally when said gasket assembly is placed in compression.

3. A gasket assembly in accordance with claim 2 in which said sealing pattern is of an incompressible elastomeric material which is deformable under compression and said gasketing layers restrict deformation of said sealing pattern.

4. A gasket assembly in accordance with claim 1 in which said gasket assembly defines at least one opening which said sealing pattern entirely surrounds.

5. A gasket assembly in accordance with claim 1 in which said sealing pattern is formed of a substantially non-deformable incompressible material.

6. A gasket assembly in accordance with claim 1 in which a third gasketing layer of a compressible material is provided, said third layer being laminated to said metallic layer, and a second sealing pattern of a substantially incompressible material disposed between said third layer and said metallic layer and enveloped therebetween, whereby in use each of said sealing patterns is protected from direct contact with said surfaces to be sealed and enhances the sealing characteristics of said gasket assembly.

7. A gasket assembly in accordance with claim 6 in which said sealing pattern is of an incompressible elastomeric material which is deformable under compression and wherein said gasketing layers restrict deformation of said sealing pattern.

8. The gasket assembly of claim 1 wherein said gasket assembly is adapted to be disposed between the head and the block of an internal combustion engine, said opening comprising a combustion opening, said gasket assembly further defining a plurality of apertures.

9. The head gasket assembly in accordance with claim 8 in which said sealing pattern is of an incompressible elastomeric material and surrounds a said combustion opening and at least one of said apertures.

10. The head gasket assembly in accordance with claim 8 in which said sealing pattern is adhered to one of said gasketing layers and said gasketing layers are adhered to each other in a zone closely surrounding said sealing pattern, thereby to prevent substantial movement of said sealing pattern laterally when said gasket assembly is placed in compression.

11. A method of making a gasket assembly for disposition between a pair of surfaces to be sealed, the steps comprising:
   disposing a relatively incompressible sealing pattern on the surface of a gasketing layer,
   positioning a facing layer over said gasketing layer and said sealing pattern so that said sealing pattern is enveloped between said gasketing layer and said facing layer one of which is relatively compressible, said gasket assembly defining at least one opening about which said sealing pattern is disposed,
   adhering said facing layer to said gasketing layer under pressure so that said facing layer is compressed and densified in the zone of said sealing pattern,
   whereby in use said sealing pattern of said gasket assembly is protected from direct contact with said surfaces to be sealed and enhances the sealing characteristics of said gasket assembly.

12. The method in accordance with claim 11 in which said facing layer is adhered to said gasketing layer in a zone closely surrounding said sealing pattern to prevent substantial movement of said sealing pattern laterally when said gasket assembly is placed in compression, thereby to control compression of said facing layer when it is compressed under pressure.

13. The method in accordance with claim 11 in which said facing layer is compressed under pressure during adhering so that the height of the projection of the facing layer above the sealing pattern is no greater than about one-half of the height of the sealing pattern.

14. The method in accordance with claim 11 in which said gasketing layer and said facing layer are each compressible so that each is compressed and disposed in the zone of said sealing pattern.

15. The method in accordance with claim 14 in which said sealing pattern is metallic.

* * * * *